(12) United States Patent
Zou et al.

(10) Patent No.: US 6,444,019 B1
(45) Date of Patent: Sep. 3, 2002

(54) INK JET INK COMPOSITION

(75) Inventors: Wan Kang Zou; Xiaomang Wang, both of Lake Bluff; Carrie Woodcock, Park Ridge; Qiao Qiao Dong, Carol Stream; Fengfei Xiao, Northbrook, all of IL (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 09/329,232

(22) Filed: Jun. 10, 1999

Related U.S. Application Data

(63) Continuation-in-part of application No. 09/187,390, filed on Nov. 6, 1998.

(51) Int. Cl.⁷ .......................... C09D 11/00; C09D 11/08; C09D 11/10
(52) U.S. Cl. ................. 106/31.4; 106/31.58; 106/31.72; 106/31.86
(58) Field of Search ............................ 106/31.4, 31.58, 106/31.72, 31.86

(56) References Cited

U.S. PATENT DOCUMENTS

| | | |
|---|---|---|
| 3,060,429 A | 10/1962 | Winston |
| 3,298,030 A | 1/1967 | Lewis et al. |
| 3,373,437 A | 3/1968 | Sweet et al. |
| 3,416,153 A | 12/1968 | Hertz et al. |
| 3,673,601 A | 6/1972 | Hertz |
| 3,846,141 A | 11/1974 | Ostergren et al. |
| 4,153,467 A | 5/1979 | Yano et al. .................... 106/20 |
| 4,228,442 A | 10/1980 | Krull |
| 4,352,901 A | 10/1982 | Maxwell et al. |
| 4,389,503 A | 6/1983 | Maxwell et al. |
| 4,734,706 A | 3/1988 | Le et al. |
| 4,892,775 A | 1/1990 | Song |
| 4,936,916 A | 6/1990 | Shinmitsu et al. |
| 5,010,125 A | 4/1991 | Kruse et al. |
| 5,270,368 A | 12/1993 | Lent et al. |
| 5,594,044 A * | 1/1997 | Yang .......................... 523/160 |
| 5,711,791 A | 1/1998 | Croker et al. |
| 5,739,829 A | 4/1998 | Loyd |
| 5,744,519 A | 4/1998 | Heraud et al. |
| 5,746,815 A | 5/1998 | Caputo |
| 5,755,860 A | 5/1998 | Zhu |
| 5,781,214 A | 7/1998 | Vonasek et al. |
| 5,980,624 A * | 11/1999 | Ichikawa ................. 106/31.58 |
| 6,087,416 A | 7/2000 | Pearlstine et al. |
| 6,113,679 A * | 9/2000 | Adkins et al. ............. 106/31.6 |
| 6,117,225 A * | 9/2000 | Nicolls .................... 106/31.65 |

FOREIGN PATENT DOCUMENTS

| | | |
|---|---|---|
| EP | 0 408 333 | 1/1991 |
| GB | 1 603 062 | 11/1981 |
| WO | WO 98/13430 | 4/1998 |
| WO | WO 99/06213 | 2/1999 |
| WO | WO 99/20699 | 4/1999 |
| WO | WO 00/27935 | 5/2000 |

OTHER PUBLICATIONS

U.S. application No. 09/578,702, Zou et al., filed May 26, 2000.
Dow Chemical Co., "DOWANOL TPM Glycol Ether"; http://www.dow.com/dowanol/nam/products/tpm.htm, © 1995–2001, no month available.
Videojet, "InkSource News", Issue No. I–35, Jun., 1995.
Dow Chemical Co., "The Glycol Ethers Handbook", Oct., 1993, 3 pages.
Dow Chemical Co., "DOWANOL DPM Glycol Ether"; http://www.dow.com/dowanol/nam/products/dpm.htm, © 1995–2001, no month available.
Dow Chemical Co., "DOWANOL EB Glycol Ether"; http://www.dow.com/dowanol/nam/products/eb.htm, © 1995–2001, no month available.
Dow Chemical Co., "DOWANOL DB Glycol Ether"; http://www.dow.com/dowanol/nam/products/db.htm, © 1995–2001, no month available.
M. R. Keeling, "Ink Jet Printing", Phys. Technol., 12(5), 196–203 (1981), no month available.
Kuhn et al., "Ink Jet Printing", Scientific American, Apr. 1979, 162–178.
Wacker–Chemie GmbH; "Pioloform® B–Polyvinylbutyrate", Aug. 1995. (7 Pgs.).
Union Carbide; "Glycoethers",1989, pp. 1–6.
Union Carbide; "PropylPROPASOL® Solvent", 1987, pp. 1–10.
Orient Chemical Corp.; "Nigrosine Group Dyes", Dec. 14, 1994, pp. 1–8.
Wacker–Chemie GmbH; Pioloform® BN 18, Aug. 1997, pp. 1–3.
Chemical Manufactures Association Solvents Council; "Using VOC–Exempt Solvents to Formulate Compliant Coatings", pp. 1–7.

(List continued on next page.)

*Primary Examiner*—Helene Klemanski
*Assistant Examiner*—Veronica F. Faison
(74) *Attorney, Agent, or Firm*—Leydig, Voit & Mayer, Ltd.

(57) ABSTRACT

The present invention provides a jet ink composition comprising a volatile organic solvent, an oil, one or more binder resins which are soluble in the volatile organic solvent, and a colorant. The ink composition is fast drying and provides excellent adhesion to non-porous substrates. Printers, such as drop-on-demand ink jet printers, employing the ink composition can operate without nozzle clogging even after long non-printing intervals. The present invention further provides a method for reducing clogging of a nozzle orifice in an ink jet printer comprising printing with an ink composition that includes an oil that forms a continuous oil phase which acts as the boundary layer between the air outside the nozzle orifice and the ink inside the nozzle during non-printing intervals. The present invention further provides a process for jet ink printing onto a substrate comprising projecting a stream of ink droplets of the ink composition of the present invention to the substrate and controlling the direction of the droplets so that the droplets form the desired printed image on the substrate.

68 Claims, No Drawings

OTHER PUBLICATIONS

Exxon Corporation; "TELURA® Industrial Process Oils", Aug. 25, 1988, pp. 1–5.

BYK–Chemie USA; "Silicone Surface Additives", Data Sheet S2, pp. 1–4.

Wacker–Chemie GmbH; Pioloform® BL 16, Aug. 1997, pp. 1–3.

Monsanto; Butvar® Polyvinyl Butyral Resin, pp. 1–9.

Lawter International, Inc.; "Krumbhaar–1717 Series Polyketone/aldehyde resins", Nov. 11, 1997, pp. 1–7.

CBA–Geigy, "Orasol Solvent Soluble Dyes".

* cited by examiner

INK JET INK COMPOSITION

CROSS-REFERENCE TO A RELATED APPLICATION

This is a continuation-in-part of co-pending U.S. patent application Ser. No. 09/187,390, filed Nov. 6, 1998, the disclosure of which is incorporated herein by reference in its entirety.

TECHNICAL FIELD OF THE INVENTION

The present invention generally relates to ink jet printing and an ink jet ink composition, and in particular, to ink jet printing with a drop-on-demand (DOD) printer and an ink composition suitable therefor.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream so that the droplets are caused to form the desired printed image on that surface. This technique of noncontact printing is well suited for application of characters onto a variety of surfaces including porous and non-porous surfaces.

Reviews of various aspects of ink jet printing can be found in these publications: Kuhn et al., *Scientific American*, April, 1979, 162–178; and Keeling, *Phys. Technol.*, 12(5), 196–303 (1981). Various ink jet apparatuses are described in the following U.S. Pat. Nos.: 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components, and wettability of the substrate. Further, the ink must be quick-drying and smear resistant, must be capable of passing through the ink jet nozzle without clogging, and must permit rapid cleanup of the machine components with minimum effort.

There are at present two types of ink jet printers, the continuous flow ink jet printers and the DOD ink jet printers. In continuous ink jet printers, ink droplets are continuously emitted from a nozzle without regard as to whether or not a printing operation is performed. The ink droplets are charged in accordance with print information data and are deflected in response to the amount of charge carried thereon as they pass through a constant high-voltage field. The thus deflected ink droplets are deposited onto a recording surface while the unused ink droplets are directed towards a beam gutter for recirculation. Since the ink droplets flow continuously through the nozzle, the risk of ink drying out and clogging the nozzle is minimal.

In DOD ink jet printers, the print head comprises a number of individual ink channels. When a certain character is to be generated on a recording surface, ink droplets are issued from some of these channels. Thus, only those ink droplets that form the character are emitted. Further, the operation of the ink jet printer can be interrupted for varying periods of time, for example, to suit the operator or factory schedule, which can be, e.g., a few hours, overnight, a week end, or longer. Since there is no continuous flow of ink droplets through the nozzles, certain problems arise from the ink drying out in the nozzle orifice during the non-printing intervals due to the ink's exposure to air. The ink drying out results in the precipitation of solids, such as the resins and colorants, at the nozzle orifice and leads to nozzle clogging. A normal or routine maintenance procedure such as purging, e.g., by applying a slight pressure to the ink cartridge to expel a small amount of the ink from the clogged nozzles, is of little or no help as the nozzles can become permanently or irreversibly clogged.

Solutions have been proposed to alleviate this problem although a satisfactory solution is lacking. For example, ink jet ink compositions have been prepared which include large amounts of one or more humectants or high boiling solvents such as glycols to reduce evaporative loss at the nozzle orifice. These inks, however, are not suitable for printing on non-porous substrates as they take excessively long times to dry on such substrates and are thus unsuitable for achieving rapid printing.

U.S. Pat. NO. 4,228,442 discloses a modified printer. Thus, the '442 patent discloses an ink jet print head that includes a chamber that is placed adjacent to the nozzle orifice and containing the liquid ink solvent therein. An absorbent material member is positioned to have one end thereof on the chamber-containing solvent and is directed to an area which is in front of the nozzle to carry fluid or vapor therearound for the purpose of providing a solvent enriched atmosphere at the nozzle orifice to prevent drying of the ink. This approach cannot, of course, be practiced with existing printers without first modifying them.

U.S. Pat. No. 5,781,214 discloses a method of preventing clogging of the nozzles by the use of an ink composition which is made up of (a) a volatile organic solvent, (b) one or more hygroscopic and low volatile components selected from the group consisting of polyhydric alcohols, glycol ethers, ethanolamines, and amides, calcium chloride, and magnesium chloride, and (c) a colorant. The ink composition may also include water and a binder resin as additional ingredients. This method relies for its operation on the moisture present in the surrounding atmosphere. According to the patent, the hygroscopic salt absorbs the atmospheric moisture which, in turn, helps to keep the salt in solution at the nozzle tip and acts to block or hinder further evaporation of the solvent. This method has its limitations. For example, since this method relies on the conditions existing in the surrounding atmosphere, the non-clogging time interval would be dependent upon the atmospheric conditions. Thus, in a dry or hot atmospheric condition, the non-clogging time interval could be significantly diminished.

The foregoing shows that there exists a need for an ink jet ink composition that is suitable for use in DOD printers. There further exists a need for an ink jet ink composition that permits operation of the ink jet printer without nozzle clogging with extended non-printing intervals. There further exists a need for an ink jet ink composition that provides good print quality and short print drying time when printed on non-porous substrates. There further exists a need for a jet ink composition that is suitable for printing on plastics, metal, and glass substrates images that have good adhesion.

These and other advantages of the present invention will be apparent from the detailed description of the preferred embodiments of the invention set forth below.

BRIEF SUMMARY OF THE INVENTION

Many of the foregoing needs have been fulfilled by the present invention which provides a jet ink composition comprising a volatile organic solvent, an oil, one or more binder resins, and a colorant. The present invention further provides a process for jet ink printing onto a substrate comprising projecting a stream of ink droplets of the ink composition of the present invention to the substrate and controlling the direction of the droplets so that the droplets form the desired printed image on the substrate.

The present invention provides a method for reducing nozzle clogging that arises due to the evaporation of the volatile solvent from the ink composition at the nozzle orifice during non-printing intervals. Accordingly, the ink composition of the present invention includes an oil that forms a continuous oil phase or a boundary layer at the nozzle orifice during non-printing intervals. The boundary layer prevents further evaporation of the volatile solvent from the ink composition and reduces formation of solids and the attendant nozzle clogging.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides a jet ink composition suitable for use in ink jet printers and having one or more of the following advantages, namely, the ink is fast drying when printed on non-porous substrates; the ink operates without nozzle clogging; the ink produces good image quality; and the printed image has good adhesion to a variety of substrates including non-porous substrates such as glass, coated paper, metal, and plastics.

The jet ink composition of the present invention comprises a volatile organic solvent, an oil, preferably a non-hygroscopic oil, one or more binder resins which are soluble in the volatile organic solvent, and a colorant. The oil preferably is a low or non-volatile oil. It is further preferred that the oil has a limited solubility in the organic solvent. The binder resin is soluble in the volatile organic solvent and also in a mixture of the volatile organic solvent and the oil; however, the binder resin is insoluble in the oil alone. Preferably, the colorant is a dye that is soluble in the organic solvent, in the solution of organic solvent and binder resin, as well as in the solution of organic solvent, binder resin, and the oil. The colorant is preferably insoluble in the oil alone.

The jet ink composition, which is a single-phase fluid, separates into a two-phase fluid at the nozzle orifice as a result of the evaporation of the volatile organic solvent. The present invention is predicated on the discovery that the oil acts as a barrier for further solvent evaporation and prevents nozzle clogging. During non-printing intervals, the volatile organic solvent evaporates at the nozzle orifice, thereby creating therein a region having a high concentration of oil, binder resin, and colorant. Once the oil concentration reaches its solubility limit in the volatile organic solvent, the oil separates from the solution as tiny micelles. These micelles come together to form tiny oil droplets in the nozzle orifice. Two or more of these droplets then coalesce to form larger oil droplets to minimize the surface area. The coalescence of the oil droplets continues with increasing concentration of the oil, as the evaporation of the organic solvent continues, until a continuous oil phase is formed in the nozzle orifice, that is, at the air/ink interface. The rate of coalescence of the droplets would be dependent upon the rate of evaporation of the organic solvent as well as the solubility of the oil in the organic solvent.

The oil phase forms a boundary layer between the air outside the nozzle orifice and the ink inside the nozzle. The binder resin and the colorant, being insoluble in the oil, separate from the oil at the orifice and move back into the nozzle channel to maintain concentration equilibrium. The interfacial repulsion between the oil and the solvent blocks the solvent from reaching the nozzle orifice. This blockage prevents further evaporation of the solvent at the nozzle orifice. Consequently, the nozzle remains free of solids and unclogged.

The jet ink composition of the present invention offers the advantage that DOD ink jet printers can be operated without nozzle clogging. Non-printing intervals of 72 hours and as long as 300 hours or more can be realized with the ink composition of the present invention. With certain embodiments of the ink composition of the present invention, DOD ink jet printers can be operated with non-printing intervals of 1500 hours or more without nozzle clogging following a normal maintenance procedure such as purging of the nozzles. Purging can be carried out by applying a slight pressure to the ink reservoir, e.g., by squeezing the ink cartridge.

Further, the ink composition of the present invention offers an advantage that the printed image is fast drying. Thus, ink drying times of less than 10 seconds are possible to obtain on non-porous substrates. This is an important improvement over DOD ink compositions that are slow drying due to the presence of large amounts of high boiling solvents such as glycols. The high boiling glycols impart high surface tension values to the ink compositions and make them unsuitable for use on certain non-porous substrates. Poor adhesion and print qualities are also encountered. In contrast, the ink composition of the present invention is free or substantially free of high boiling solvents such as glycols. The relatively low surface tension of the ink composition of the present invention offers an advantage that the print quality on non-porous substrates such as plastics is greatly improved.

The ink composition of the present invention is suitable for use in a drop-on-demand ink jet printer and has a viscosity of from about 3 centipoises (cps) to about 50 cps at 25° C. The ink composition of the present invention can also be formulated, for example, by including a conductivity enhancing agent, to be suitable for use in continuous ink jet printers. For use in continuous ink jet printing systems, the jet ink composition generally has the following characteristics: (1) a viscosity of from about 1.6 to about 7.0 cps at 25° C.; (2) an electrical resistivity of from about 50 to about 2000 ohm-cm; and (3) a sonic velocity of from about 1100 to about 1700 meters/second.

A detailed description of the ingredients and a method of preparing the inventive ink composition as well as the advantages and salient features of the present invention are set forth below.

Organic Solvent

The jet ink composition of the present invention comprises one or more volatile organic solvents. Any suitable volatile organic solvent or a mixture thereof can be used. A mixture of solvents may be desired, for example, when more than one binder resin is used and one of the binder resins has a limited solubility in one of the solvents. Further, it is preferable to use a solvent or a mixture thereof that provides the desired evaporation rate since the ink drying time on substrates, particularly non-porous substrates, is controlled significantly by the volatility or the evaporation rate of the solvent.

Although volatility of the solvent is an important and desirable property to be considered in selecting a solvent, excessive volatility is less desirable since it could adversely affect the ink performance, e.g., it could cause excessive or increased nozzle clogging. Accordingly, it is preferred that a solvent having a relative evaporation rate of about 0.1 or higher, and more preferably from about 0.3 to about 5.0, is used, wherein n-butyl acetate has a standard evaporation rate of 1.0. The relative evaporation rates of various solvents can be obtained, for example, from publications of the Chemical Manufacturers Association Solvents Council, Arlington, Va.

Any suitable volatile organic solvent can be used, for example, alcohols, esters, ketones, amides, ethers, glycol ethers, and halides can be used. Alcohols, esters, ketones, glycol ethers, and glycol ether esters are preferred solvents. Lower alcohols, esters, and ketones are particularly preferred. An example of a suitable alcohol is ethanol. Examples of glycol ethers includes 1-methoxy-2-propanol and n-propoxypropanol. A particular example of ketones is acetone. Ethyl lactate is a preferred ester.

1-Methoxy-2-propanol has a relative evaporation rate of 0.9, ethanol has a relative evaporation rate of 1.7, and acetone has a relative evaporation rate of 7.0. To achieve the desired evaporation rate, mixtures of organic solvents can be used. Thus, for example, a mixture of 1-methoxy-2-propanol and a second solvent can be used. For example, a mixture comprising 1-methoxy-2-propanol and a solvent selected from the group consisting of n-propoxypropanol, 1-methoxy-2-propyl acetate, and ethyl lactate, can be used.

Typically the volatile organic solvent is present in an amount of from about 20% by weight to about 90% by weight and preferably from about 60% by weight to about 85% by weight of the jet ink composition. Where a mixture of volatile organic solvents, for example, a mixture of 1-methoxy-2-propanol and a second solvent is used, the second solvent is typically used in an amount of up to about 50% by weight of the jet ink composition, preferably in an amount of up to about 40% by weight of the jet ink composition, and more preferably in an amount of from about 10% by weight to about 30% by weight of the jet ink composition.

Oil

The jet ink composition of the present invention comprises an oil, preferably a low or non-volatile oil, and more preferably a non-hygroscopic oil. The oil preferably absorbs very little moisture from the atmosphere. Examples of suitable oils include petroleum oils, non-drying oils, and semi-drying oils. Any suitable oil can be used. The oil preferably has an initial boiling point of from about 300° F. to about 800° F. and more preferably from about 400° F. to about 600° F. The oil preferably has a 50% boiling point of from about 450° F. to about 900° F. and more preferably from about 500° F. to about 800° F. The oil preferably has an average molecular weight of from about 200 to about 900. The oil has little, preferably no, solubility or affinity for the binder resin and the colorant.

The oil plays an important role in determining the performance of the ink composition. As discussed above, the oil undergoes phase separation as the volatile solvent evaporates at the nozzle orifice. The rate or speed of the phase separation should be carefully controlled. A phase separation that is too rapid on the one hand would promote ink instability problems. On the other hand, a phase separation that is too slow would hamper the migration of the binder resin and colorant into the organic solvent rich phase in the interior of the nozzle. The rate of phase separation can be controlled by a careful choice of the oil's solubility in the organic solvent. Thus, the oil has a limited or low solubility in the organic solvent, typically below about 20% by weight of the volatile organic solvent, and preferably from about 2% by weight to about 20% by weight, and more preferably from about 4% by weight to about 10% by weight, of the volatile organic solvent.

Examples of suitable oils include aromatic oils, paraffinic oils, extracted paraffinic oils, naphthenic oils, extracted naphthenic oils, mixture of hydrotreated light oils, mixture of hydrotreated light and heavy oils, vegetable oils, vegetable oil derivatives, and combinations thereof. Examples of suitable commercially available oils include white oils such as MAGIESOL™ 52 and MAGIESOL 60 from Magie Bros. Oil Co. (Pennzoil Products) in Franklin Park, Ill., hydrotreated light naphthenic distillates such as N-60-HT INKOL™ (Magie Bros.), and a mixture of hydrotreated light and heavy naphthenic distillates such as N-100-HT INKOL (Magie Bros.).

Further examples of suitable oils include the TELURA™ brand industrial process oils available from Exxon Co. in Houston, Tex. Examples of aromatic oils include TELURA 126 and 171, examples of naphthenic oils include TELURA 315, 323, 330, and 343, an example of an extracted naphthenic oil is TELURA 417, examples of paraffinic oils include TELURA 516 and 521, and examples of extracted paraffinic oils include TELURA 607, 612, 613, and 619. Examples of naphthenic oils include the TUFFLO™ brand process oils available from Exxon Co. and HYDROCAL™ II naphthenic base oils available from Calumet Lubricant Co. in Princeton, La. An example of a vegetable oil derivative is AGRISOLV™ H, which is available from Lawter International, Inc. in Northbrook, Ill.

Typically the oil is present in an amount of up to about 8% by weight, preferably from about 1% by weight to about 8% by weight, and more preferably from about 2% by weight to about 5% by weight, of the jet ink composition.

Binder Resin

The jet ink composition of the present invention comprises one or more binder resins. Any suitable binder resin(s) can be used with at least one binder resin being a film former. The binder resin provides adhesion to the substrates, particularly non-porous substrates. The binder resin is soluble in the volatile organic solvent as well as in a mixture of the organic solvent and the oil. The binder resin is insoluble or substantially insoluble in the oil.

The molecular weight of the binder resin is of significance.in contributing to the performance of the ink composition. The binder resin should have a molecular weight sufficient to form a robust film; however, the molecular weight should not be excessive. For example, as the organic solvent at the nozzle orifice or opening evaporates during non-printing intervals, the concentration of the binder resin increases in this region. The binder resin should not precipitate at the nozzle opening as its concentration increases. Instead, the binder resin should be able to migrate to the interior of the nozzle and become part of the ink composition therein. Since the migration (or diffusion) and solubility of the binder resin are related to its molecular weight, the molecular weight of the binder resin should not be excessive. Thus, for example, the binder resin can have a weight average molecular weight of about 500,000 or less, preferably about 100, 000 or less, and more preferably less than about 30,000.

Examples of suitable binder resins include the polyketone resins, polyvinyl acetate, polyurethane, hydrocarbon resins, and polyvinyl acetal resins. Polyketone resins can be prepared by condensing a ketone with an aldehyde. Thus, for example, cyclohexanone can be condensed with formaldehyde to produce a polyketone resin. Examples of suitable polyketone resins include the KRUMBHAAR™ K-1717HMP, K-1717, and K-3107 resins, produced from cyclohexanone and formaldehyde and available from Lawter International, Inc. in Kenosha, Wis. An example of a hydrocarbon resin is the thermoplastic resin, NEVEX™ 100, available from Neville Chemical Co. in Pittsburgh, Pa. Polyvinyl acetal resins can be prepared by condensing polyvinyl alcohol and an aldehyde. Thus, polyvinyl butyral can be prepared by condensing polyvinyl alcohol and butyraldehyde. Examples of suitable polyvinyl butyral resins include BUTVAR™ resins available from the Monsanto Co. in St. Louis, Mo., and PIOLOFORM™ resins available from Wacker-Chemie GmbH in Burghausen, Germany.

The binder resin can be present in the jet ink composition in an amount of up to about 50% by weight, preferably from about 2% by weight to about 30% by weight, and more preferably in an amount of from about 10% by weight to about 20% by weight of the jet ink composition.

Colorant

The jet ink composition comprises one or more colorants that impart the desired color to the printed message. Any dye, pigment, or lake that may be dissolved or dispersed in the ink composition can be used. Dyes are particularly preferred.

Examples of dyes suitable for use in the preparation of the jet ink composition include, but are not limited to, solvent dyes. Examples of suitable dyes include C.I. Solvent Blacks 3, 7, and 29 (Orient Chemical), C.I. Solvent Black 13 (Tricon Color Inc.), C.I. Solvent Black 70 (Ciba), and C.I. Solvent Red 125 (Crompton & Knowles Colors). The dyes also can be polymeric. For example, polymeric dyes such as MILLIJET™ Black 40, MILLIJET Red 17, MILLIJET Orange 31, MILLIJET Violet 82, MILLIJET Yellow 26, and MILLIJET Blue 28 (MillikenChemical) can be used. The colorant can be employed in any suitable amount, for example, in an amount of from about 0.05% to about 20% by weight of the jet ink composition, preferably in an amount of from about 0.5% to about 15% by weight of the jet ink composition, and more preferably in an amount of from about 3% by weight to about 10% by weight of the jet ink composition.

Surface Active Agent

The jet ink composition of the present invention can further include a surface active agent. Surface active agents can improve the performance of the ink composition, for example, offer improved ink dot definition. Any suitable surface active agent, including silicones, siloxanes, acrylics, and fluoroaliphatic polyesters, can be employed. A particular example of a siloxane is the polyester modified polydimethylsiloxane available as BYK™ 333 from BYK-Chemie USA in Wallingford, Conn. The surface tension of the jet ink composition of the present invention is preferably from about 26 dynes/cm to about 34 dynes/cm. The relatively low ink surface tension makes the ink particularly suitable for printing on non-porous substrates such as plastics.

The surface active agent can be present in the jet ink composition in an amount of up to about 5% by weight of the ink composition, preferably in an amount of from about 0.05% to about 1% by weight of the ink composition, and more preferably in an amount of from about 0.1% to about 0.5% by weight of the ink composition.

The jet ink composition of the present invention can include additional ingredients to improve its performance. Thus, for example, the jet ink composition can include an additive to improve print quality. Examples of such an additive include glycols and pyrrolidones. Preferred examples of the additive are diethylene glycol and N-methyl pyrrolidone. The additive can be included in any suitable amount, for example, in an amount of up to about 6%, and preferably from about 2% to about 4%, by weight of the jet ink composition.

The following examples further illustrate the present invention but, of course, should not be construed as in any way limiting its scope.

EXAMPLE 1

This Example illustrates the preparation of a black jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
| --- | --- |
| 1-Methoxy-2-Propanol (Ashland Chemical) | 71.4 |
| Polyketone Resin, K-1717HMP (Lawter International) | 15.0 |
| Polyketone Resin, K-3107 (Lawter International) | 2.5 |
| Solvent Black 29 (Orient Chemical) | 4.0 |
| Polyester Modified Polydimethylsiloxane (BYK333, BYK-Chemie USA) | 0.1 |
| Extracted Paraffinic Oil (Exxon) | 3.0 |
| Diethylene Glycol (Ashland Chemical) | 4.0 |
| | 100.0 |

The ink composition had the following properties at 25° C.: Viscosity, 8.2 cps; electrical resistivity, 9189 ohm-cm; pH, 3.6; specific gravity, 0.982; velocity of sound, 1344 meter/second; and surface tension, 28.6 dynes/cm.

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging with a 300 hour non-printing interval between each printing cycle.

EXAMPLE 2

This Example illustrates the preparation of a red jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
| --- | --- |
| 1-Methoxy-2-Propanol (Ashland Chemical) | 73.4 |
| Polyvinyl Butyral, PLIOLOFORM BL 16 (Wacker Chemie) | 0.5 |
| Polyketone Resin, K-1717HMP (Lawter International) | 15.5 |
| Polyketone Resin, K-3107 (Lawter International) | 1.5 |
| Solvent Red 125 (Crompton & Knowles Colors) | 4.0 |
| Polyester Modified Polydimethylsiloxane (BYK333, BYK-Chemie USA) | 0.1 |

-continued

| Ingredients | % by wt. |
|---|---|
| Extracted Paraffinic Oil (Exxon) | 3.0 |
| Diethylene Glycol (Ashland Chemical) | 2.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 3

This Example illustrates the preparation of another black jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
|---|---|
| 1-Methoxy-2-Propanol (Ashland Chemical) | 68.8 |
| Polyketone Resin, K-1717HMP (Lawter International) | 16.5 |
| Polyketone Resin, K-3107 (Lawter International) | 2.5 |
| Solvent Black 29 (Orient Chemical) | 5.1 |
| Polyester Modified Polydimethylsiloxane (BYK333, BYK-Chemie USA) | 0.1 |
| TUFFLO Process Naphthenic Oil (Exxon) | 3.0 |
| N-Methyl pyrrolidone (ISP) | 4.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 4

This Example illustrates the preparation of yet another black jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
|---|---|
| Ethyl Alcohol (Ashland Chemical) | 15.0 |
| 1-Methoxy-2-Propanol (Ashland Chemical) | 53.4 |
| Polyketone Resin, K-1717HMP (Lawter International) | 17.0 |

-continued

| Ingredients | % by wt. |
|---|---|
| Polyketone Resin, K-3107 (Lawter International) | 3.0 |
| Solvent Black 29 (Orient Chemical) | 4.5 |
| Polyester Modified Polydimethylsiloxane (BYK333, BYK-Chemie USA) | 0.1 |
| Technical Grade White Oil (Pennzoil Products) | 4.0 |
| Diethylene Glycol (Ashland Chemical) | 3.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 5

This Example illustrates the preparation of another red jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
|---|---|
| 1-Methoxy-2-Propanol (Ashland Chemical) | 68.7 |
| Polyketone Resin, K-1717HMP (Lawter International) | 17.5 |
| Polyketone Resin, K-3107 (Lawter International) | 3.7 |
| Solvent Red 125 (Crompton & Knowles Colors) | 4.0 |
| Polyester Modified Polydimethylsiloxane (BYK333, BYK-Chemie USA) | 0.1 |
| Mixture of Hydrotreated Light and Heavy Naphthenic Oil (Pennzoil Products) | 4.0 |
| Diethylene Glycol (Ashland Chemical) | 2.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 6

This Example illustrates the preparation of yet another black jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
| --- | --- |
| Ethyl Alcohol (Ashland Chemical) | 13.0 |
| 1-Methoxy-2-Propanol (Ashland Chemical) | 54.0 |
| Polyketone Resin, K-1717HMP (Lawter International) | 18.5 |
| Polyketone Resin, K-3107 (Lawter International) | 2.5 |
| Solvent Black 29 (Orient Chemical) | 4.9 |
| Polyester Modified Polydimethylsiloxane (BYK333, BYK-Chemie USA) | 0.1 |
| Vegetable Oil Derivative (AGRISOLV H, Lawter International) | 3.0 |
| Diethylene Glycol (Ashland Chemical) | 4.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 7

This Example illustrates the preparation of another black jet ink composition of the present invention that is suitable for use in a DOD ink jet printer. The following ingredients were combined in the order listed and mixed until all solid components were dissolved. The resulting mixture was filtered to remove any particulates and the ink composition was recovered.

| Ingredients | % by wt. |
| --- | --- |
| 1-Methoxy-2-Propanol (Ashland Chemical) | 68.5 |
| Hydrocarbon Resin, NEVEX 100 (Neville Chemical) | 4.8 |
| Polyketone Resin, K-1717HMP (Lawter International) | 15.6 |
| Solvent Black 29 (Orient Chemical) | 4.5 |
| Polyester Modified Polydimethylsiloxane (BYK333, BYK-Chemie USA) | 0.1 |
| Paraffinic Oil (Exxon) | 2.0 |
| Diethylene Glycol (Ashland Chemical) | 4.5 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 8

This Example illustrates the preparation of a black jet ink composition employing a polymeric dye (MILLIJET Black 40) in accordance with the present invention. The following ingredients were combined in the order listed and mixed until all solid components were dissolved. The resulting mixture was filtered to remove any particulates and the ink composition was recovered.

| Ingredients | % by wt. |
| --- | --- |
| 1-Methoxy-2-Propanol (Ashland Chemical) | 74.4 |
| Polyketone Resin, K-1717HNP (Lawter International) | 8.0 |
| Polyketone Resin, K-3107 (Lawter International) | 2.5 |
| MILLIJET Black 40 (MillikenChemical) | 8.0 |
| Polyester Modified Polydimethylsiloxane (BYK333, BYK-Chemie USA) | 0.1 |
| Extracted Paraffinic Oil (Exxon) | 2.5 |
| N-Methyl Pyrrolidone (ISP) | 4.5 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The printer nozzles were purged after each 1,500-hour non-printing interval in accordance with a normal maintenance procedure, and ink jet printing was carried out without nozzle clogging.

EXAMPLE 9

This Example illustrates the preparation of a blue jet ink composition employing a polymeric dye (MILLIJET Blue 28) in accordance with the present invention. The following ingredients were combined in the order listed and mixed until all solid components were dissolved. The resulting mixture was filtered to remove any particulates and the ink composition was recovered.

| Ingredients | % by wt. |
| --- | --- |
| 1-Methoxy-2-Propanol (Ashland Chemical) | 59.4 |
| n-Propoxypropanol (Ashland Chemical) | 10.0 |
| Polyketone Resin, K-1717HMP (Lawter International) | 15.0 |
| Polyketone Resin, K-3107 (Lawter International) | 2.5 |
| MILLIJET Black 28 (MillikenChemical) | 8.0 |
| Polyester Modified Polydimethylsiloxane (BYK333, BYK-Chemie USA) | 0.1 |
| Technical Grade White Oil (Pennzoil Products) | 3.0 |
| Diethylene Glycol (Ashland Chemical) | 2.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The printer nozzles were purged after each 1,500-hour non-printing interval in accordance with a normal maintenance procedure, and ink jet printing was carried out without nozzle clogging.

EXAMPLE 10

This Example illustrates the preparation of another black jet ink composition in accordance with the present invention. The following ingredients were combined in the order listed and mixed until all solid components were dissolved. The resulting mixture was filtered to remove any particulates and the ink composition was recovered.

| Ingredients | % by wt. |
|---|---|
| 1-Methoxy-2-Propanol (Ashland Chemical) | 63.4 |
| 1-Methoxy-2-Propyl Acetate (Union Carbide) | 20.0 |
| Polyvinyl Butyral, PIOLOFORM LL 4150 (Wacker Chemie) | 4.5 |
| IOSOL Black (Solvent Black 13, Tricon Color Inc.) | 5.0 |
| Polyester Modified Polydimethylsiloxane (BYK333, BYK-Chemie USA) | 0.1 |
| Paraffininc Oil (Exxon) | 2.0 |
| Diethylene Glycol (Ashland Chemical) | 5.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

EXAMPLE 11

This Example illustrates the preparation of another black jet ink composition in accordance with the present invention. The following ingredients were combined in the order listed and mixed until all solid components were dissolved. The resulting mixture was filtered to remove any particulates and the ink composition was recovered.

| Ingredients | % by wt. |
|---|---|
| 1-Methoxy-2-Propanol (Ashland Chemical) | 58.9 |
| Ethyl Lactate (Riba Corp.) | 10.0 |
| Polyketone Resin, K-1717HMP (Lawter International) | 13.5 |
| Polyketone Resin, K-3107 (Lawter International) | 2.5 |
| Oil Black 860 (Solvent Black 3, Orient Chemical) | 5.0 |
| Polyester Modified Polydimethylsiloxane (BYK333, BYK-Chemie USA) | 0.1 |
| Extracted Paraffinic Oil (Exxon) | 5.0 |
| N-Methyl Pyrrolidone (ISP) | 5.0 |
| | 100.0 |

The ink composition was printed using a representative DOD ink jet printer on a variety of non-porous substrates including glass, stainless steel, aluminum, polyethylene, polyester, polystyrene, and polyvinyl chloride. The printed image was found to have a drying time of less than 10 seconds. The image had excellent non-rub off properties. The ink jet printer operated without nozzle clogging.

The present invention further provides a process of jet ink printing onto a substrate comprising projecting a stream of ink droplets of the ink composition of the present invention to the substrate and controlling the direction of the droplets so that the droplets form the desired printed image on the substrate. The present invention further provides a method for reducing clogging of a nozzle orifice in an ink jet printer comprising printing with an ink composition that includes an oil that forms a boundary layer between the air outside the nozzle orifice and the ink inside the nozzle orifice during non-printing intervals. The present invention further provides a method for printing with a drop-on-demand ink jet printer comprising projecting a stream of droplets of an ink composition through one or more nozzle orifices to a substrate, wherein the ink composition includes an oil that forms a continuous oil phase at the nozzle orifice during non-printing intervals.

The references cited herein, including patents and publications, are hereby incorporated by reference in their entirety.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the spirit and scope of the invention as defined by the following claims.

What is claimed is:

1. An ink composition comprising a volatile organic solvent, an oil, one or more binder resins which are soluble in said volatile organic solvent and insoluble or substantially insoluble in the oil, and a colorant, wherein the ink composition is suitable for ink jet printing and is a single phase liquid, the oil is present in an amount of up to about 8% by weight of the ink composition, the oil has a solubility of from about 2% by weight to about 20% by weight of the volatile organic solvent, and the oil is chosen such that it will phase separate when it reaches its solubility limit if the volatile organic solvent is lost due to evaporation.

2. The ink composition of claim 1, wherein said volatile organic solvent has an evaporation rate of about 0.1 or higher relative to n-butyl acetate standard whose evaporation rate is 1.0.

3. The ink composition of claim 2, wherein said volatile organic solvent has an evaporation rate of from about 0.3 to about 5.0 relative to n-butyl acetate.

4. The ink composition of claim 2, wherein said colorant comprises a dye.

5. The ink composition of claim 1, wherein said oil has a solubility of from about 4% by weight to about 10% by weight of said volatile organic solvent.

6. The ink composition of claim 4, wherein said dye is insoluble or substantially insoluble in said oil.

7. The ink composition of claim 1, wherein said binder resin has a weight average molecular weight of about 500,000 or less.

8. The ink composition of claim 7, wherein said binder resin has a weight average molecular weight of about 30,000 or less.

9. The ink composition of claim 1, wherein said volatile organic solvent is selected from the group consisting of alcohols, ketones, esters, ethers, glycol ethers, glycol ether esters, and combinations thereof.

10. The ink composition of claim 8, wherein said volatile organic solvent is selected from the group consisting of alcohols, ketones, esters, glycol ethers, glycol ether esters, and combinations thereof.

11. The ink composition of claim 11, wherein said volatile organic solvent is selected from the group consisting of ethanol, 1-methoxy-2-propanol, n-propoxypropanol, 1-methoxy-2-propyl acetate, ethyl lactate, and combinations thereof.

12. The ink composition of claim 1, wherein said binder resin is selected from the group consisting of polyketone resins, polyurethanes, polyvinyl acetate, hydrocarbon resins, polyvinyl butyral resins, and combinations thereof.

13. The ink composition of claim 1, wherein said oil is selected from the group consisting of petroleum oils, non-drying oils, and semi-drying oils.

14. The ink composition of claim 1, wherein said oil is selected from the group consisting of aromatic oils, paraffinic oils, extracted paraffinic oils, naphthenic oils, extracted naphthenic oils, mixture of hydrotreated light oils, mixture of hydrotreated light and heavy oils, vegetable oils, vegetable oil derivatives, and combinations thereof.

15. The ink composition of claim 1, wherein said oil has an initial boiling point of from about 300° F. to about 800° F.

16. The ink composition of claim 1, wherein said oil has an initial boiling point of from about 400° F. to about 600° F.

17. The ink composition of claim 1, wherein said oil has a 50% boiling point of from about 450° F. to about 900° F.

18. The ink composition of claim 17, wherein said oil has a 50% boiling point of from about 500° F. to about 800° F.

19. The ink composition of claim 1, wherein said oil has an average molecular weight of from about 200 to about 900.

20. The ink composition of claim 4, wherein said dye is selected from the group consisting of C.I. Solvent Blacks 3, 7, 13, 29, and 70 and C.I. Solvent Red 125.

21. The ink composition of claim 1, wherein said colorant comprises a polymeric dye.

22. The ink composition of claim 1, including a surface active agent.

23. The ink composition of claim 22, wherein said surface active agent is a siloxane.

24. The ink composition of claim 23, wherein said siloxane is a polyester modified polydimethylsiloxane.

25. The ink composition of claim 1, including a glycol or pyrrolidone additive.

26. The ink composition of claim 25, wherein said glycol or pyrrolidone additive is diethylene glycol or N-methyl pyrrolidone.

27. An ink composition comprising a volatile organic solvent, a non-hygroscopic oil, one or more binder resins which are soluble in said volatile organic solvent and insoluble or substantially insoluble in the oil, and a colorant, wherein the ink composition is suitable for ink jet printing and is a single phase liquid, the non-hygroscopic oil is present in an amount of up to about 8% by weight of the ink composition, and the non-hygroscopic oil has a solubility of from about 2% by weight to about 20% by weight of the volatile organic solvent, and the non-hygroscopic oil is chosen such that it will phase separate when it reaches its solubility limit if the volatile organic solvent is lost due to evaporation.

28. A method of jet ink printing onto a substrate comprising projecting a stream of ink droplets to said substrate and controlling the direction of said droplets so that the droplets form the desired printed image on the substrate, wherein said ink droplets are formed from the ink composition of claim 1.

29. The method of claim 28, wherein said substrate is a non-porous substrate.

30. The method of claim 28, wherein said printing is carried out in a drop-on-demand mode.

31. A method for printing with a drop-on-demand ink jet printer comprising projecting a stream of droplets of an ink composition through one or more nozzle orifices to a substrate, wherein said ink composition includes a volatile organic solvent and an oil, wherein the oil is dissolved in the volatile organic solvent and the oil phase-separates and forms a continuous oil phase at the nozzle orifice during non-printing intervals and said ink composition is suitable for ink jet printing and is a single phase liquid, and the oil has a solubility of from about 2% by weight to about 20% by weight of the volatile organic solvent, and the oil is chosen such that it will phase separate when it reaches its solubility limit if the volatile organic solvent is lost due to evaporation.

32. The method of claim 31, wherein said ink composition comprises a colorant and one or more binder resins which are soluble in the volatile organic solvent.

33. The method of claim 32, wherein said volatile organic solvent has an evaporation rate of about 0.1 or higher relative to n-butyl acetate standard whose evaporation rate is 1.0.

34. The method of claim 32, wherein said oil has a solubility of from about 2% by weight to about 20% by weight of said volatile organic solvent.

35. The method of claim 32, wherein said binder resin is insoluble or substantially insoluble in said oil.

36. A method for reducing clogging of a nozzle orifice in an ink jet printer comprising printing with an ink composition including a volatile organic solvent and an oil which is dissolved in the volatile organic solvent, wherein the oil phase-separates and forms a boundary layer between the air outside the nozzle orifice and the ink composition inside the nozzle orifice during non-printing intervals, and wherein the ink composition is suitable for ink jet printing and is a single phase liquid, and the oil has a solubility of from about 2% by weight to about 20% by weight of the volatile organic solvent, and the oil is chosen such that it will phase separate when it reaches its solubility limit if the volatile organic solvent is lost due to evaporation.

37. The method of claim 36, wherein said ink composition comprises a colorant and one or more binder resins which are soluble in said volatile organic solvent.

38. The method of claim 37, wherein said volatile organic solvent has an evaporation rate of about 0.1 or higher relative to n-butyl acetate standard whose evaporation rate is 1.0.

39. The method of claim 37, wherein said binder resin is insoluble or substantially insoluble in said oil.

40. The method of claim 31, wherein said oil is a non-hygroscopic oil.

41. The method of claim 36, wherein said oil is a non-hygroscopic oil.

42. The method of claim 31, wherein said nozzle orifice is purged prior to printing.

43. The method of claim 36, wherein said nozzle orifice is purged prior to printing.

44. An ink composition comprising a colorant dissolved or dispersed in a single phase solution comprising a volatile organic solvent, an oil which is soluble in the volatile organic solvent, one or more binder resins which are soluble in the volatile organic solvent and insoluble or substantially i soluble in the oil, wherein the ink composition is suitable for use in ink jet printing and the oil is present in an amount of up to about 8% by weight of the ink composition, and the oil has a solubility of from about 2% by weight to about 20% by weight of the volatile organic solvent, and the oil is chosen such that it will phase separate when it reaches its solubility limit if the volatile organic solvent is lost due to evaporation.

45. An ink composition comprising a volatile organic solvent, an oil, one or more binder resins which are soluble in said volatile organic solvent and insoluble or substantially insoluble in the oil, a colorant, and a surface active agent which is a siloxane, and the oil has a solubility of from about 2% by weighs to about 20% by weight of the volatile organic solvent, and the oil is chosen such that it will phase separate when it reaches its solubility limit if the volatile organic solvent is lost due to evaporation.

46. The ink composition of claim 46, wherein the siloxane is a polyester modified polydimethylsiloxane.

47. An ink composition comprising a volatile organic solvent, an oil, one or more binder resins which are soluble in said volatile organ solvent, and a colorant, wherein the oil is selected from the group consisting of aromatic oils, paraffinic oils, extracted paraffinic oils, naphthenic oils, extracted naphthenic oils, mixture of hydrotreated light oils, mixture of hydrotreated light and heavy oils, and combinations thereof.

48. An ink composition comprising a volatile organic solvent, an oil, one or more binder resins which are soluble in said volatile organic solvent and insoluble or substantially insoluble in the oil, and a colorant, wherein the volatile organic solvent is selected from the group consisting of 1-methoxy-2-propanol, n-propoxypropanol, 1-methoxy-2-propyl acetate, ethyl lactate, and combinations thereof, and the oil has a solubility of from about 2% by weight to about 20% by weight of the volatile organic solvent, and the oil is chosen such that it will phase separate when it reaches its solubility limit if the volatile organic solvent is lost due to evaporation.

49. The ink composition of claim 1, including two or more volatile organic solvents.

50. An ink composition comprising a volatile organic solvent, an oil, one or more binder resins which are insoluble or substantially insoluble in the oil, and a colorant, wherein the ink composition is suitable for ink jet printing and is a single phase liquid and the oil is present in an amount of up to about 8% by weight of the ink composition, and the oil has a solubility of from about 2% by weight to about 20% by weight of the volatile organic solvent, and the oil is chosen such that it will phase separate when it reaches its solubility limit if the volatile organic solvent is lost due to evaporation.

51. An ink composition comprising a volatile organic solvent, an oil, one or more binder resins which are soluble in the volatile organic solvent, and a colorant, wherein the ink composition is suitable for ink jet printing and is a single phase liquid, wherein the oil is present in an amount of up to about 8% by weight of the ink composition, and wherein the binder resin is selected from the group-consisting of polyvinyl acetate, hydrocarbon resins, and combinations thereof.

52. A method of jet ink printing onto a substrate comprising projecting a stream of ink droplets to said substrate and controlling the direction if said droplets so that the droplets form the desired printed image on the substrate, wherein said ink droplets are formed from the ink composition of claim 50.

53. A method of jet ink printing onto a substrate comprising projecting a stream of ink droplets to said substrate and controlling the direction of said droplets so that the droplets form the desired printed image on the substrate, wherein said ink droplets are formed from the ink composition of claim 51.

54. The ink composition of claim 46, wherein said volatile organic solvent has an evaporation rate of about 0.1 or higher relative to n-butyl acetate standard whose evaporation rate is 0.1.

55. The ink composition of claim 54, wherein said volatile organic solvent has an evaporation rate of from about 0.3 to about 5.0 relative to n-butyl acetate.

56. The ink composition of claim 54, wherein said colorant comprises a dye.

57. The ink composition of claim 46, wherein said one or more binder resins have a weight average molecular weight of about 500,000 or less.

58. The ink composition of claim 57, wherein said one or more binder resins have a weight average molecular weight of about 30,000 or less.

59. The ink composition of claim 46, wherein said volatile organic solvent is selected from the group consisting of alcohols, ketones, esters, ethers, glycol ethers, glycol ether esters, and combinations thereof.

60. The ink composition of claim 58, wherein said volatile organic solvent is selected from the group consisting of alcohols, ketones, esters, glycol ethers, glycol ether esters, and combinations thereof.

61. The ink composition of claim 60, wherein said volatile organic solvent is selected from the group consisting of ethanol, 1-methoxy-2-propanol, n-propoxypropanol, 1-methoxy-2-propyl acetate, ethyl lactate, and combinations thereof.

62. The ink composition of claim 46, wherein said one or more binder resins are selected from the group consisting of polyketone resins, polyurethanes, polyvinyl acetate, hydrocarbon resins, polyvinyl butyral resins, and combinations thereof.

63. The ink composition of claim 56, wherein said dye is selected from the group consisting of C.I. Solvent Blacks 3, 7, 13, 29, and 70 and C.I. Solvent Red 125.

64. The ink composition of claim 46, including a surface active agent.

65. The ink composition of claim 64, wherein said surface active agent is a siloxane.

66. The ink composition of claim 65, wherein said siloxane is a polyester modified polydimethylsiloxane.

67. The ink composition of claim 46, including a glycol or pyrrolidone additive.

68. The ink composition of claim 67, wherein said glycol or pyrrolidone additive is diethylene glycol or N-methyl pyrrolidone.

* * * * *

UNITED STATES PATENT AND TRADEMARK OFFICE
CERTIFICATE OF CORRECTION

PATENT NO.   : 6,444,019 B1                                          Page 1 of 1
DATED        : September 3, 2002
INVENTOR(S)  : Zou et al.

It is certified that error appears in the above-identified patent and that said Letters Patent is hereby corrected as shown below:

Column 6,
Line 44, "ce.in" should read -- ce in --.

Column 15,
Line 15, the dependence of "1" should read -- 15 --.

Column 16,
Line 58, "i soluble" should read -- insoluble --.

Column 18,
Line 10, "0.1" should read -- 1.0 --.
In claims 54, 57, 62, 64 and 67, the dependancy should be on claim 47.

Signed and Sealed this

Eighth Day of April, 2003

JAMES E. ROGAN
*Director of the United States Patent and Trademark Office*